(12) United States Patent
Carrouset et al.

(10) Patent No.: US 10,697,299 B2
(45) Date of Patent: Jun. 30, 2020

(54) METHOD FOR DESIGNING AND BUILDING A WHEEL

(71) Applicant: CARPYZ SAS, Issy les Moulineaux (FR)

(72) Inventors: Pierre Carrouset, Paris (FR); Nicole Carrouset, Paris (FR); Gabrielle Carrouset, Paris (FR)

(73) Assignee: Carpyz SAS, Issy les Moulineaux (FR)

( * ) Notice: Subject to any disclaimer, the term of this patent is extended or adjusted under 35 U.S.C. 154(b) by 289 days.

(21) Appl. No.: 15/542,275

(22) PCT Filed: Dec. 2, 2015

(86) PCT No.: PCT/EP2015/078341
§ 371 (c)(1),
(2) Date: Jul. 7, 2017

(87) PCT Pub. No.: WO2016/110364
PCT Pub. Date: Jul. 14, 2016

(65) Prior Publication Data
US 2017/0362940 A1    Dec. 21, 2017

(30) Foreign Application Priority Data

Jan. 9, 2015 (FR) ...................................... 15 00031

(51) Int. Cl.
*B23P 15/00* (2006.01)
*F01D 5/02* (2006.01)
(Continued)

(52) U.S. Cl.
CPC .............. *F01D 5/02* (2013.01); *B23P 15/006* (2013.01); *B64C 11/24* (2013.01); *F01D 1/32* (2013.01);
(Continued)

(58) Field of Classification Search
CPC ..... F01D 5/02; F01D 5/18; F01D 1/32; F01D 5/048; B64C 11/24; B64C 11/005;
(Continued)

(56) References Cited

U.S. PATENT DOCUMENTS 4,120,213 A * 10/1978 Levy ..................... F16H 47/085
475/53
4,227,855 A * 10/1980 Flynn ...................... F01D 5/043
415/218.1
(Continued)

FOREIGN PATENT DOCUMENTS

DE           3640780 A1    10/1988

OTHER PUBLICATIONS

International Search Report issued in connection with PCT Application No. PCT/EP2015/078341 dated Jan. 26, 2016.

*Primary Examiner* — Rick K Chang
(74) *Attorney, Agent, or Firm* — Steven M. Shape; Dennemeyer & Associates, LLC

(57) ABSTRACT

A method for designing and building a wheel that is simultaneously a turbine and an impeller with a plurality of impeller blades, wherein each impeller blade of the plurality of impeller blades is hollow along an entire length of the impeller blade and which leads into a peripheral circular chamber that operates as a fueled engine (THRA). The method includes building an evolving section of an inner channel of the impeller blades with a plurality of strips each having a neutral axis, wherein each impeller blade rests on a profile of a plurality of profiles of a corresponding neutral axis, the profile built for an inlet to the turbine and for inlets to each impeller blade.

10 Claims, 1 Drawing Sheet

(51) Int. Cl.
*F01D 1/32* (2006.01)
*F01D 5/04* (2006.01)
*F04D 29/30* (2006.01)
*B64C 11/24* (2006.01)
*F01D 5/18* (2006.01)

(52) U.S. Cl.
CPC ............... *F01D 5/048* (2013.01); *F01D 5/18* (2013.01); *F04D 29/30* (2013.01); *B23P 2700/01* (2013.01); *F05D 2220/30* (2013.01); *F05D 2250/313* (2013.01); *F05D 2250/71* (2013.01)

(58) Field of Classification Search
CPC .... B23P 15/006; B23P 2700/01; F04D 29/30; F05D 2250/313; F05D 2220/30; F05D 2250/71
See application file for complete search history.

(56) References Cited

U.S. PATENT DOCUMENTS

| | | | | |
|---|---|---|---|---|
| 6,402,467 | B1 * | 6/2002 | Godichon | F04D 29/023 415/200 |
| 7,785,098 | B1 * | 8/2010 | Appleby | B29C 33/302 264/319 |
| 8,602,653 | B2 * | 12/2013 | Heshmat | B23Q 1/70 384/103 |
| 8,998,581 | B2 * | 4/2015 | Giovannetti | F04D 29/023 416/180 |
| 9,206,309 | B2 * | 12/2015 | Appleby | B22C 9/04 |
| 9,328,717 | B1 * | 5/2016 | Walker | F03D 3/005 |
| 2003/0147745 | A1 | 8/2003 | Canali | |
| 2003/0235272 | A1 * | 12/2003 | Appleby | B29C 33/302 378/147 |

* cited by examiner

U.S. Patent
Jun. 30, 2020
US 10,697,299 B2
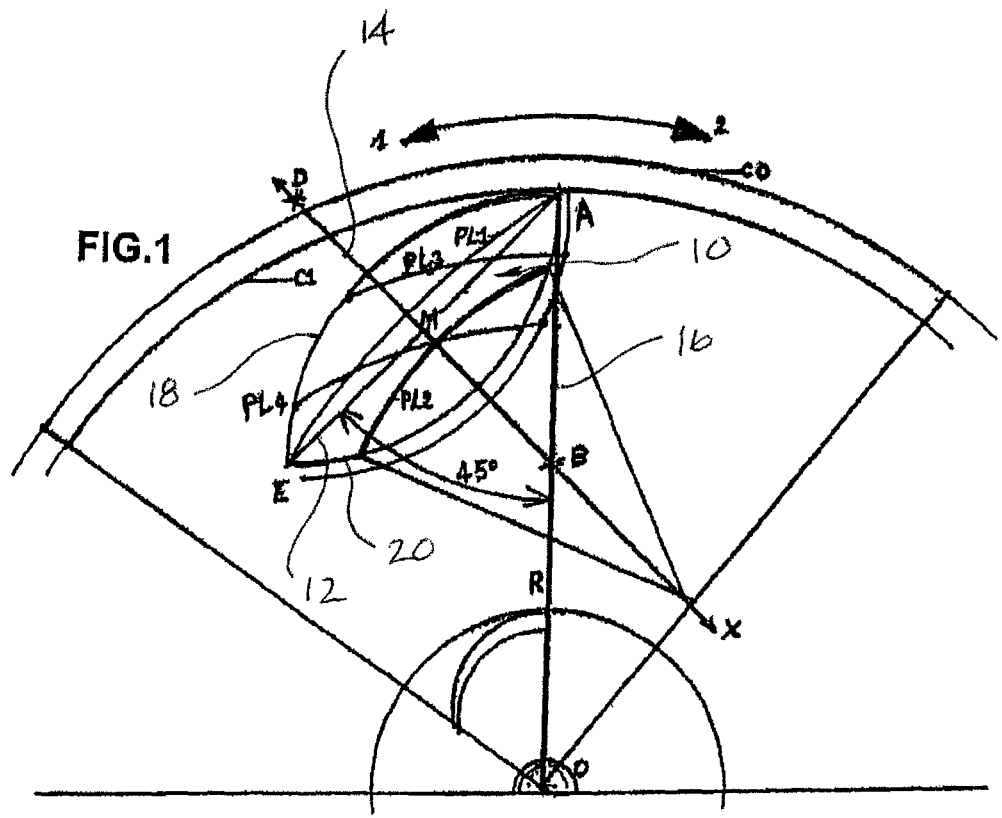
FIG.1
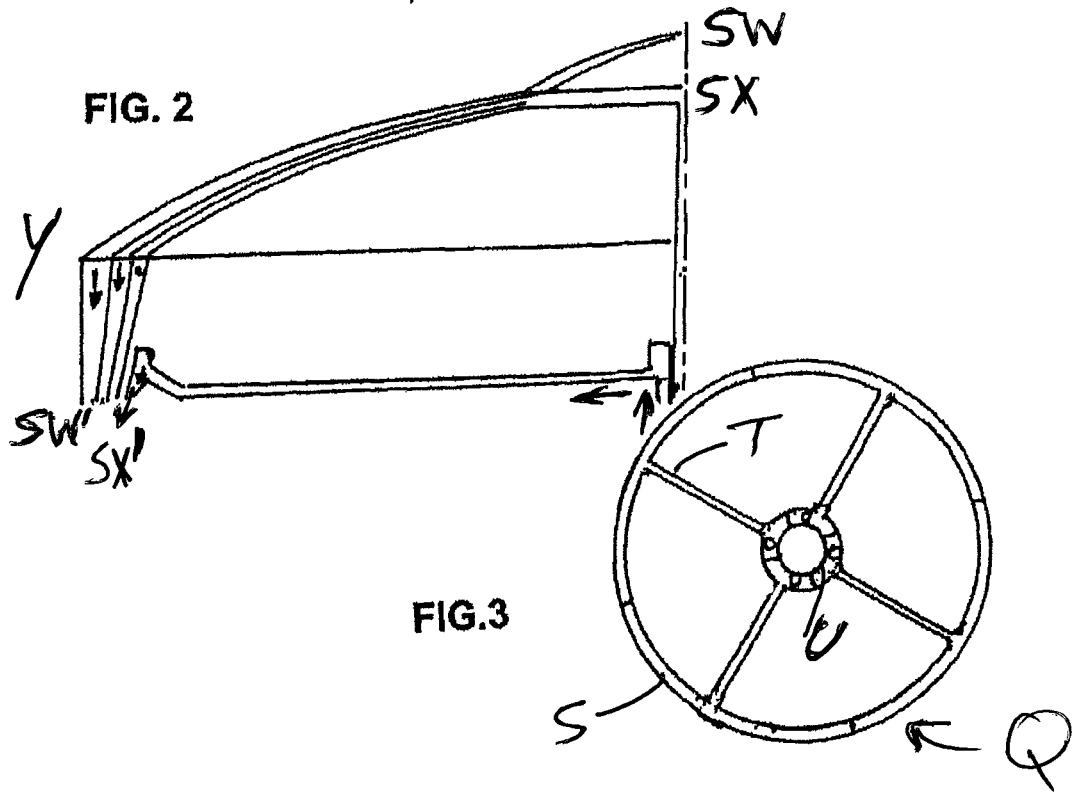
FIG. 2
FIG.3

METHOD FOR DESIGNING AND BUILDING A WHEEL

BACKGROUND

The improvement of the axial thrust of impellers has long been researched and the recent applications for Patents in France; in particular those published under numbers Fr 2,987,655 from 7 Oct. 2012 and Fr 2,987,656 from 15 Oct. 2012 show a new principle that consists in allowing the fluid in through a wheel and making it cross the impeller blades that are hollow, thus benefiting from the centrifugal force and ending in a peripheral circular chamber provided with a circular opening that ejects the fluid downwards from the wheel, thus creating a reaction force from the resistance on the neighbouring boundary layers of fluid. The addition of the three principles allows notably increasing the axial thrust as much as it can be increased in a large amount by an energetic fluid introduced through the shaft into the engine such as compressed air or hydrogen as with rockets.

The small-scale samples built do not allow the industrialization of these products and several years of work would have been necessary to discover a method that would allow these products to be constructed on-screen with such complex shapes in a more logical and technical manner and to keep developing them more easily. Computers receiving files nowadays allow the large-scale manufacture anywhere in the world of identical products designed in any country.

We have not found in any of the prior art in the world any products equivalent to the one described herein.

BRIEF DESCRIPTION OF THE DRAWINGS

These drawings are provided as an example and are outlined and simplified in order to better illustrate the text in the description and claims.

FIG. 1 shows geometric elements referenced with the letters and numbers used for the method described herein.

FIG. 2 shows channels partitioned by portions of circles inside the impeller blades that each end in a chamber and have at the lower part thereof an independent circular chamber fed from a fixed bearing that surrounds the shaft and that receives a fluid.

FIG. 3 shows a plan view of the fixed partitioned circular chamber that is independent from the other rotating ones that surround it and its feeding through a fixed partitioned bearing chamber.

DETAILED DESCRIPTION

The method for designing and building wheels, turbines, impellers, and fueled engines, in which the impeller blades are hollow along their length and lead into a peripheral chamber provided with a circular opening, causes the neutral axes of the strips of the hollow impeller blades to be each built individually on-screen, on sections of wheels placed with different diameters, using digitized geometric elements with fundamental basic values that are provided at the start by the designer for construction of the wheel.

This method for designing and building wheels that are simultaneously a turbine, and an impeller with blades that are hollow along the entire length thereof and which lead into peripheral circular chambers that operate as a fueled engine (THRA), includes for each set of turbine, impeller, and engine, the profiles of the neutral axes of the strips that are mostly portions of circles, are built for the inlet to the turbine and for the inlets to the hollow blades of the impellers and their arrival at their chambers, and are individually configured by initially giving values to the basic geometrical elements and are traced according to specific geometrical arrangements on circular plates of differing diameters which are then arranged at different levels of the wheel and are placed at an angle on the same axis independently to one another.

The particular arrangement of the basic geometrical elements for each circular plate is obtained by being inscribed within a wheel, e.g., a circle (C1) from the center (0) of which extends a spoke (R) with a given numerical value that meets the circle (C1) at a preferential point of intersection (A).

The circle C1 is a surface of revolution that is swept by the leading edge of the strip 10 during rotation of the wheel. Another numerical value is given to the chord 12 of the arc that is the portion of the circle of the neutral axis of the strip in question.

A first end of this chord 12 starts at the preferential point of intersection (A) and an opposite second end (E) is located inside the circle on an axis that starts from the preferential point of intersection (A) and forms an angle of 45° with the spoke (R). The position chosen for this axis on the right or the left of the spoke determines the desired direction of rotation for the wheel (in a counterclockwise direction 1 or in a clockwise direction 2). Another point (B) is placed on the spoke (R) towards the center, located at a numerical value which is equal to a length of the spoke of the circle that surrounds the circle (C1) minus a numerical value that is equal to the square root of the sum of the squares of a length of the two ½ chords (Pythagoras).

A straight line 14 with a numerical value identical to that of the chord 12 is extended from point (B) and intersects at the midpoint thereof with the midpoint of the chord (M) to which it is perpendicular and generates a point at its other end (D). The point (B) located on the spoke (R) serves as a center with a numerical value equal to a length of the straight line 16 between the preferential point of intersection (A) and the point (B) for the portion of the circle that joins both ends of the chord (M) between the preferential point of intersection (A) and the point (E) that is the arc 18 thereof and that is the desired circular profile of the strip 10. The point (D) located on the other end of the straight line 14 that intersects the chord (M) at its midpoint serves as the center for tracing the portion of the circle that stretches between the preferential point of intersection (A) and the point (E) of the chord (M) which is also the arc 20 thereof and which is the other desired circular profile of the strip 10 opposing and symmetrical with the arc 18 of the strip 10.

The centers of other circles located on the perpendicular straight line 14 and that have diameter values greater than or less than a length of straight line 14 allow the same to join or not the ends of the straight line 12 and to generate portions of circles with flatter or more curved profiles (PL1, PL2) but which can also benefit from this method. The portion of the circle (PL2) is not linked to points A and E, the straight line 12 also being a strip profile that can be used. The profiles built with this method and with the same numerical values on each side of the spoke are symmetrical.

The mixing of the strip profiles obtained with this method make it possible, by changing the parameters, to build evolving blades with specific characteristics.

The numerical values of the profiles of the neutral axes built according to this method are mathematically quantifiable. The same wheel may use different turbine strip profiles and different profiles of hollow impeller blade strips that are defined using the same method but with different profiles on the same wheel.

In this method, the plates receiving the neutral axis profiles, determined as stated above, are built with different numerical values of profiles that are associated, mixed, partially overlapping, tangled, concave or convex or joined to one another by the material of the plate, in order to build the strip profiles necessary for the turbo inlet and the hollow impeller blades and the inlet of the peripheral circular chambers.

When the hollow blades no longer allow one another to be held in place by the plate material, a ring (C1) is added to fasten them around the outside of the plate (CO). Conversely when the impeller blades do not need to support one another, the plate disappears with the hollows in the blades and only the profiles of the blade strips that are coated in matter remain and are fastened to one another.

The hollows in the impeller blades are intersected by portions of circles that are concentric to the wheel and generate complementary channels inside the hollow impeller blades each leading into an independent circular chamber that surrounds the entire wheel and is preferably provided with spacers and a circular groove with a nozzle-shaped profile.

In addition, the channel of the hollow impeller blade receives tubes that originate from the central shaft and continue each inside the hollow blade or the portions of hollow blades until their individual peripheral circular chambers.

It is worth mentioning the presence of a non-rotating peripheral circular chamber Q is placed with some clearance inside those that do rotate and that this chamber is internally divided into angular sectors S that are sealed off from one another, each being fed by a channel T that comes from a fixed ring U that is kept on the shaft by means of a bearing and that redirects the channels T towards a central place that allows fluid to be fed towards each sector S.

In a supplementary manner for certain applications the wheel is built in several parts:
  a first independent connected assembly is formed by a first plate that joins the strips necessary for feeding the turbo, a second plate that has the openings necessary for feeding the hollow impeller blades;
  a second independent connected assembly is formed by a third plate from which extend only the strips of the hollow impeller blades that will then join a fourth independent plate that receives the strips of the hollow impeller blades with the necessary openings to feed the peripheral circular chambers;
  a third independent connected assembly is formed by a fifth plate that caps the assembly of the circular chambers in agreement with the inlets provided by the fourth plate, with the understanding that the chambers have a very wide range of characteristics and construction choices;
  other plates may also be placed on demand in between the impeller blades.

One important characteristic of these wheels is that the plates are not preferably flat discs but preferably curved upwards or downwards in the shape of a semi-spherical or frustoconical bowl, and on which the inlets and outlets of the impeller blades are inscribed as close as possible to their respective plates.

The rotating or non-rotating chambers are made of pressure- and temperature-resistant materials, either by making the nature of the material evolve progressively if it is sintered or by manufacturing the chambers independently and then arranging them on the corresponding plate.

It is important to indicate that the surface of the inner channel of the blades is quantified at the level of each plate by using the mathematical geometric process described above and that these values are then compared to one another in order to determine the profile to be applied to the inner channel of the blade along its length.

Preferably, the inlet surface of the inner channel SW-SX of the blades is quantified at the level of each plate Y by using the mathematical geometric methods of the invention, and the inlet surface of each blade depends on the number of blades chosen that cover the surface of the disc swept by the impeller, preferably without the blades overlapping one another, and on the length given to the chord contained within the blade and that a surface value equivalent to that of the channel inlet is matched by the outlet SW'-SX' of the impeller blade as it penetrates the circular chamber, this surface potentially having a coefficient, and using the same mathematical geometric processes to define this outlet surface. These values are then compared to one another to determine the profile to be given to the internal channel of the blade along its length.

The strip of the bottom surface of the impeller blades is provided by a chord that is no longer at 45° and allows separating at will the top and bottom surface strips within the leading and trailing edges at the inlet and outlet of the blade channel, the rigidity of the assembly of the blade strips being guaranteed by profiled and oriented comma-shaped spacers (PL3, PL4) placed between the strips.

One preferred characteristic of this method includes the fact that the neutral axes are coated in material, using the principle of Patent WO 2008/012425, which builds the surface of a blade using only 5 mathematical values assigned to portions of geometrical shapes that have a reference center, and are preferably arranged according to or close to values provided by the neutral axes according to this method. In particular, the neutral axes are coated in material, using the principle described in Patent WO 2008/012425, based on numerical values provided by the neutral axes to arrange the material on both sides of the axis or coating it at least partially.

The invention claimed is:

1. A method for designing and building a wheel that is simultaneously a turbine and an impeller with a plurality of impeller blades, wherein each impeller blade of the plurality of impeller blades is hollow along an entire length of the impeller blade and which leads into a peripheral circular chamber that operates as a fueled engine (THRA), the method comprising:
  building an evolving section of an inner channel of the impeller blades with a plurality of strips each having a neutral axis, wherein each impeller blade rests on a profile of a plurality of profiles of a corresponding neutral axis, the profile built for an inlet to the turbine and for inlets to each impeller blade,
  wherein each profile arrives at the peripheral circular chamber, and is individually configured by tracing each profile according to a geometrical arrangement on a circular plate having a corresponding diameter which is then arranged at a different level position of the wheel at an angle on a same axis independently to-additional profiles of the plurality of profiles,
  wherein the geometrical arrangement on the circular plate is obtained by being inscribed within a circle (C1) from a center (0) of which extends a spoke (R) with a first numerical value that meets the circle (C1) at a preferential point of intersection (A), wherein the circle (C1) is a surface of revolution that is swept by a leading edge of the corresponding strip during rotation of the wheel, wherein a second numerical value is given to a chord of an arc that is a portion of the circle of the neutral axis of the corresponding strip, a first end of the chord starting at a preferential point of intersection (A) and an opposite second end of the chord (E) being located inside the circle on an axis that starts from the preferential point of intersection (A) and forms an angle of 45° with the spoke (R), wherein a position chosen for the axis on a right or a left of the spoke determines a desired direction of rotation of the wheel (1 or 2), and a second point (B) placed on the spoke towards the center at third numerical value which is that of the spoke of the circle that surrounds the circle (C1) minus a fourth numerical value that is a square root of a sum of the squares of a length of two ½ chords, wherein a straight line with a fifth numerical value identical to that of the chord extends from the second point (B) such that a midpoint of the straight line intersects a midpoint of a chord (M) that is perpendicular thereto and generates a third point at its other end (D) relative to the second point (B), wherein the second point (B) located on the spoke serves as a center with a length to the center of the circle equal to that of a portion of the straight line for a portion of the circle that stretches between the preferential point of intersection and the second end of the chord that is the arc thereof and that is a first desired circular profile of the strip, and wherein the third point (D) located on the opposing end of the portion of the straight line that intersects the chord at its midpoint serves as a center for tracing a portion of a circle that stretches between the preferential point of intersection and the second end of the chord M which is also an arc thereof and which is a second desired circular profile of the strip symmetrical with the first desired circular profile of the strip.

2. The method according to claim 1, wherein the plates are built with different numerical parameters of profiles that are associated, mixed, or partially overlapping, or tangled, concave or convex, or joined to one another by the plate, and when the impeller blades are not held in place by the plate, a ring couples the impeller blades to an outside of the plate (CO), and when the impeller blades do not need to hold one another in place, the profiles of the plurality of strips are coated in matter and are fastened to one another.

3. The method according to claim 1, wherein a hollow of each impeller blade is intersected by portions of circles that are concentric to the wheel and generate a complementary channel inside the hollow, the complementary channel leading into the independent peripheral circular chamber that surrounds the entire wheel and is provided with spacers and a circular groove with a nozzle-shaped profile.

4. The method according to claim 3, wherein the channel of the hollow impeller blade receives a plurality of tubes that originate from a central shaft and continue each inside the hollow or a portion of the hollow the independent peripheral circular chamber.

5. The method according to claim 1, wherein a non-rotating peripheral circular chamber is placed with clearance inside a rotating peripheral circular chamber, the non-rotating peripheral chamber is internally divided into a plurality of angular sectors that are sealed from one another, each angular sector of the plurality of angular sectors being fed by a channel from a fixed ring on a shaft by a bearing and that redirects the channel towards a central place that allows fluid to be fed towards each angular sector.

6. The method according to claim 1, further comprising:

forming a first independent connected assembly by a first plate that joins, with the strips necessary for feeding the turbo, a second plate that has openings for feeding the hollow impeller blades;

forming a second independent connected assembly by a third plate from which extend the strips of the hollow impeller blades that join a fourth independent plate that receives the strips of the hollow impeller blades with the openings to feed the peripheral circular chambers; and forming a third independent connected assembly by a fifth plate that caps the assembly of the circular chambers in agreement with the inlets provided by the fourth plate, wherein rotating peripheral circular chambers or non-rotating peripheral circular chambers are made of a pressure-resistant and temperature-resistant material, wherein a nature of the material evolves progressively by sintering or by manufacturing the chambers independently and arranging the rotating peripheral circular chambers or the non-rotating peripheral circular chambers on a corresponding plate.

7. The method according to claim 1, wherein the plate is curved upwards or downwards in a shape of a semi-spherical or frustoconical bowl, and on which the inlets and the outlets of the impeller blades are inscribed as close as possible to their respective plates.

8. The method according to claim 1, wherein an inlet surface of the inner channel of the blades is quantified at the level of each plate and the inlet surface of each blade depends on a number of blades covering a surface of a disc swept by the impeller, without the blades overlapping one another, and a length given to the chord contained within the blade and that an area size of the surface value equivalent to that of the channel inlet is matched by the outlet of the impeller blade as it penetrates the circular chamber, the surface having a coefficient, and using a same mathematical geometric processes to define the surface of the outlet of the impeller blade the length value and the surface value then being compared to one another to determine the profile to be given to the internal channel of the blade along its length.

9. The method according to claim 1, wherein the strip of a bottom surface of the impeller blade is provided by a chord with an arc that allows a top surface strip and a bottom surface strip at a leading edge and a trailing edge at the inlet and outlet of the blade channel to be separated, and wherein profiled and oriented comma-shaped spacers (PL3, PL4) placed between adjacent strips of the plurality of strips provide a rigidity of the assembly of the blade strips.

10. The method according to claim 1, further comprising coating the neutral axes in material that builds an area of a blade using only 5 mathematical values given to portions of geometrical figures that have a center of reference, and are placed according to values provided by the neutral axes.

* * * * *